(No Model.)

W. R. PATTEN.
SPLIT PULLEY.

No. 531,216. Patented Dec. 18, 1894.

Witnesses:
Harry T. Rohrer
G. M. Copenhaver

Inventor:
William R. Patten
By William H. Lamar,
Atty

UNITED STATES PATENT OFFICE.

WILLIAM R. PATTEN, OF CHATTANOOGA, TENNESSEE.

SPLIT PULLEY.

SPECIFICATION forming part of Letters Patent No. 531,216, dated December 18, 1894.

Application filed April 3, 1894. Serial No. 506,194. (No model.)

*To all whom it may concern:*

Be it known that I, WILLIAM R. PATTEN, a citizen of the United States, residing at Chattanooga, in the county of Hamilton and State of Tennessee, have invented certain new and useful Improvements in Split Pulleys; and I do hereby declare the following to be a full, clear, and exact description of the invention such as will enable others skilled in the art to which it appertains to make and use the same.

The invention relates especially to means for securing the two parts of wooden split pulleys to each other and to the shafts with which they are to rotate. A common wooden bushing is employed and the parts of this are forced against the shaft by the action of an adjustable clamp not attached to the bushing but to which both parts of the pulley are secured instead of being more directly united.

Figure 1:
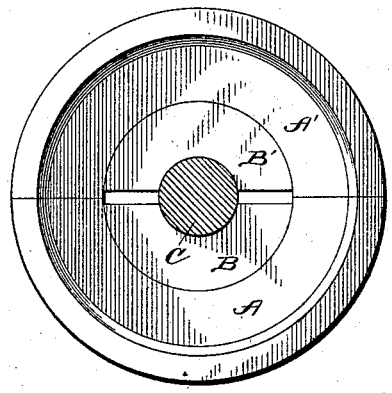
Figure 2:
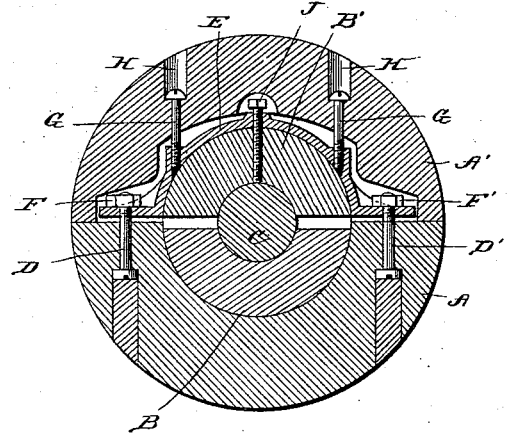
Figure 3:
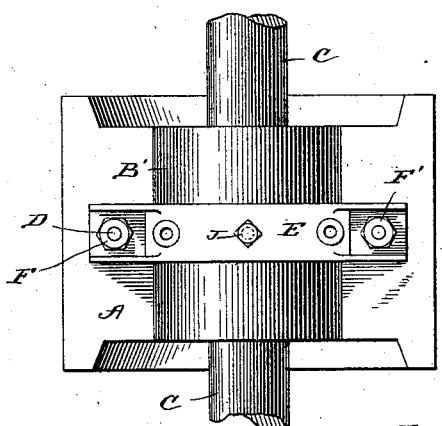
Figure 4:
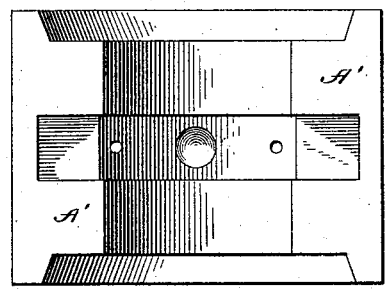
Figure 5:
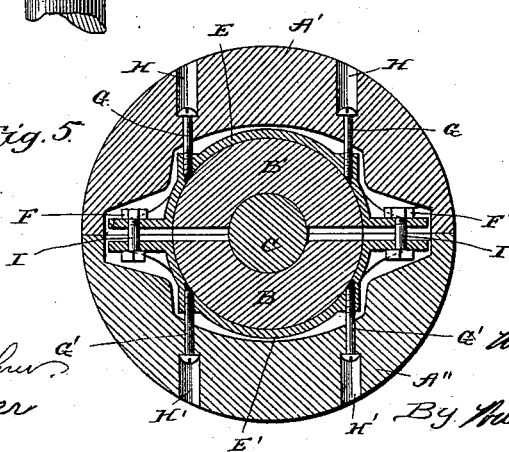

In the accompanying drawings, Figure 1 is a view of the pulley looking along the line of the shaft. Fig. 2 is a central section perpendicular to the shaft. Fig. 3 is a top view with upper part of the pulley detached and removed. Fig. 4 shows the lower side of the removed part. Fig. 5 is a view analogous to Fig. 2 showing a modified construction.

In the drawings, A, A' are the two parts of the pulley and B, B' the corresponding parts of the bushing, each of the latter being each a little less than half a hollow cylinder whose internal diameter equals that of the shaft, C, upon which the pulley is fixed. The part A of the pulley is provided with threaded studs, D, D', projecting, one upon each side of the shaft, from the plane central face of this part or that face which normally coincides with the plane of division of the pulley, considered as a whole. These studs may conveniently be short bolts inserted from the periphery of the pulley in holes preferably deeply counterbored for the bolt heads. Over the free ends of the studs pass the ends of a clamp E, centrally curved outward from this part of the pulley to form an arch spanning and fitting the bushing and having its ends adjustably secured by nuts F working upon the ends of the studs. The other part of the pulley is not attached directly to the part A but is fastened to the clamp by bolts G, preferably having their heads slotted to receive a screwdriver, lying in counter-bored holes H, engaging in threaded apertures in the clamp and preferably projecting slightly therethrough when screwed home to press or impinge upon the part of the bushing which lies immediately within the clamp.

To apply the pulley thus constructed to the shaft, the part A is brought up to one side of the shaft and the clamp is placed in position to pass around the opposite side and secured by engaging the nuts with the studs. The two parts of the bushing are then slipped into place and adjusted, and the nuts are screwed on until any desired force of compression is exerted to bind the bushing securely to the shaft. The other part of the pulley is then brought to place and fixed to the clamp by means of the bolts G, G,—and the pulley is ready for work.

The inner face of the part A' of the pulley is, of course, cut away to make room for the clamp, and in small solid pulleys, like the one chosen for illustration, none of the devices uniting the parts are visible after the pulley has been attached to the shaft.

In the modification illustrated in Fig. 5, the clamp E' is a duplicate of the clamp E and the ends of the two are joined by bolts I which take the place of the studs D, D' in the compression of the bushing. In this case, the part A'' of the pulley is a duplicate of the part A''' and the two are attached and removed in precisely the same way, the bushing being clamped to the shaft and the two parts of the pulley being secured to the clamp successively. In either case, the pulley is prevented from slipping upon the bushing not only by frictional engagement but by the bolts G which act as set-screws; and indeed the bushing itself may if desired be setscrewed to the shaft, as suggested in Fig. 2, since this metal clamp affords a firm bearing for a setscrew J, which really also still further secures the pulley itself and prevents its rotation independently of the shaft.

It is evident that where the size of the pulley makes it desirable, the number of bolts D, D', G, may be increased.

What I claim is—

1. The combination with a split pulley and a split bushing having its halves in direct frictional engagement with bushing seats in the corresponding halves of the pulley, of metal band sunk in one of said seats and passing around one half-bushing, bolts detachably connecting said band with the half-pulley in which it lies, and bolts detachably connecting the same band with the other half of the pulley.

2. The combination with a split pulley, of a cylindrical split bushing fitting directly in seats in the corresponding halves of the body of the pulley, a central metal band sunk in one of said seats and extending around the convex surface of the corresponding half bushing, bolts detachably securing the ends of the band to the opposite half of the pulley and bolts securing the remaining half of the pulley directly to the central portion of said band.

3. The combination with a wooden split pulley and a suitable bushing therefor, of a metal bushing clamp fitting around one side of the bushing, means for drawing said clamp against the bushing, and headed bolts projecting inward from one part of said pulley, engaging in threaded apertures in said clamp, and at their inner ends impinging upon the bushing.

4. The combination with one half of a split pulley, of a metal band arching the axial channel in said half and adjustably and detachably secured, at its ends, to the half pulley, upon opposite sides of said channel, a second half pulley recessed to receive said band, and bolts adjustably securing said second half to said band.

In testimony whereof I affix my signature in presence of two witnesses.

WILLIAM R. PATTEN.

Witnesses:
J. M. HARDAWAY,
W. A. MOORE.